United States Patent
Liang et al.

(10) Patent No.: US 6,504,865 B1
(45) Date of Patent: Jan. 7, 2003

(54) DIGITAL CONNECTION DETECTION TECHNIQUE

(75) Inventors: Haixiang Liang, San Jose; Mark Gonikberg, Mountain View, both of CA (US)

(73) Assignee: Altocom, Inc., Irvine, CA (US)

( * ) Notice: Subject to any disclaimer, the term of this patent is extended or adjusted under 35 U.S.C. 154(b) by 0 days.

(21) Appl. No.: 09/256,922

(22) Filed: Feb. 24, 1999

(51) Int. Cl.$^7$ .............................. H04B 1/38; H04L 5/16
(52) U.S. Cl. ..................... 375/222; 375/220; 375/216
(58) Field of Search .............................. 375/222, 219, 375/220, 257, 216, 231; 379/27.03, 27.04, 406.1, 399.02; 370/250, 251, 360, 284, 292

(56) References Cited

U.S. PATENT DOCUMENTS

| | | | |
|---|---|---|---|
| 5,267,300 | 11/1993 | Kao et al. ................... | 379/93 |
| 5,528,679 | 6/1996 | Taarud ....................... | 379/34 |
| 5,579,369 | 11/1996 | Feiner et al. .............. | 379/22 |
| 5,793,809 | 8/1998 | Holmquist .................. | 375/242 |
| 5,818,870 | 10/1998 | Yaguchi ..................... | 375/219 |
| 5,831,561 | 11/1998 | Cai et al. ................... | 341/106 |
| 5,859,872 | 1/1999 | Townshend .................. | 375/242 |
| 5,875,229 | 2/1999 | Eyuboglu et al. ........... | 379/1 |
| 5,926,505 | 7/1999 | Long ........................... | 375/222 |
| 6,069,921 | * 5/2000 | Kaplan ........................ | 375/243 |
| 6,115,395 | * 9/2000 | Norrell et al. .............. | 370/523 |
| 6,118,812 | * 9/2000 | Dagdeviren ................. | 375/229 |
| 6,301,296 | * 10/2001 | Krishnan et al. ............ | 375/222 |

FOREIGN PATENT DOCUMENTS

| | | |
|---|---|---|
| WO | 98 13979 A | 4/1998 |
| WO | 98 17044 A | 4/1998 |
| WO | 98 37657 A | 8/1998 |

OTHER PUBLICATIONS

International Telecommunication Union, "Series V: Data Communication Over the Telephone Network", V.90, Sep. 1998, pp. 1–50.

3Com Corporation, 3Com V.90 Technology White Paper, 4/98, pp. 1–8.

P. Michael Henderson, White Paper: 56Kbps Data Transmission Across the PSTN, How does it work?, printed Feb. 10, 1999, ©1997, pp. 1–15.

* cited by examiner

Primary Examiner—Chi Pham
Assistant Examiner—Phuong Phu
(74) Attorney, Agent, or Firm—Zagorin, O'Brien & Graham, LLP

(57) ABSTRACT

A technique is described for reliably determining whether a direct digital connection exists between a transmitting server modem and a receiving client modem. Such a determination is an essential part of the training procedure for modems that conform to ITU-T Recommendation V.90 but is also applicable to other data communications configurations and equipment. In some configurations in accordance with the present invention, segments of a modem training signal, L1L2, are used to make the determination.

58 Claims, 4 Drawing Sheets

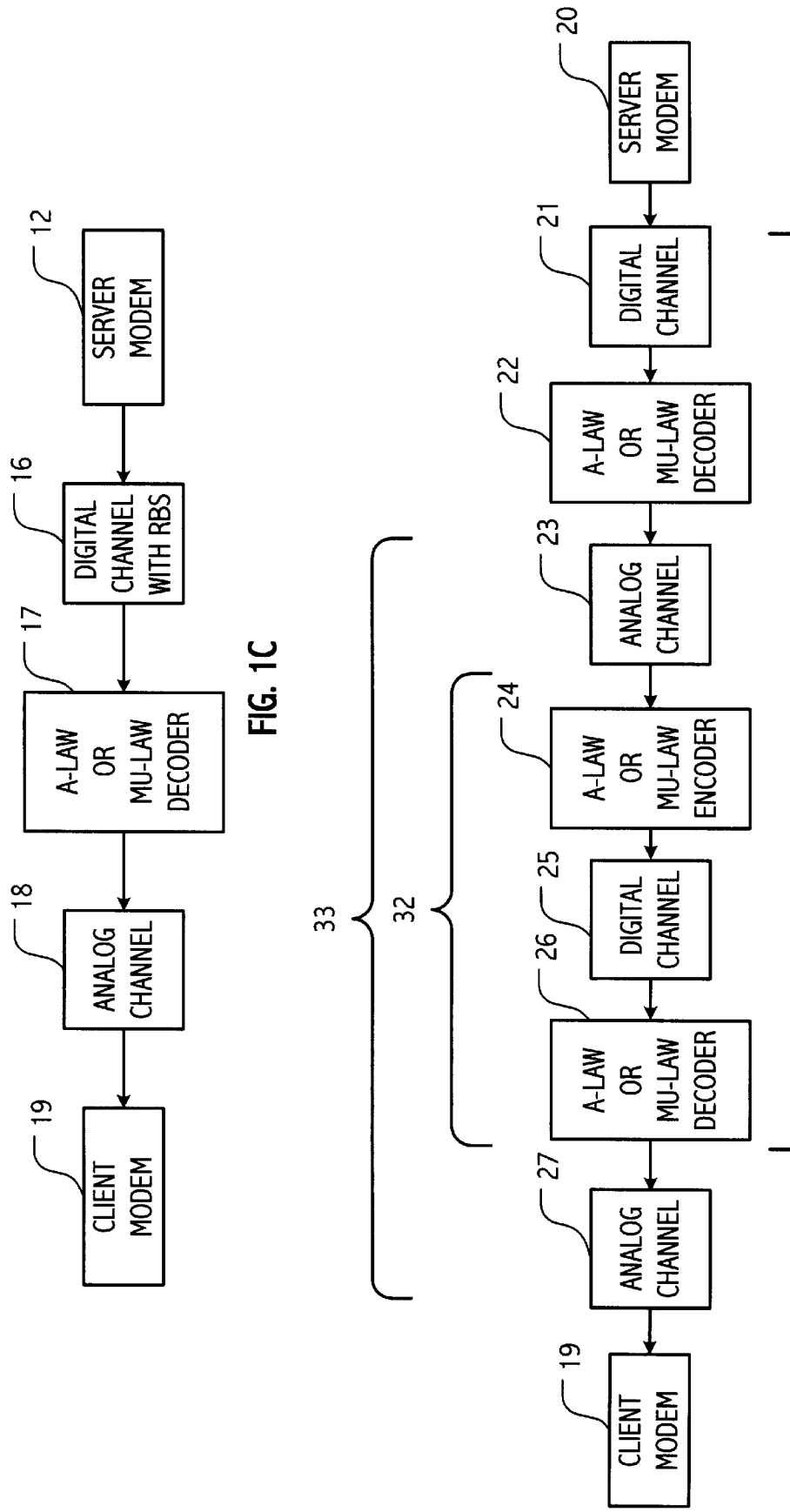

DIGITAL CONNECTION DETECTION TECHNIQUE

BACKGROUND OF THE INVENTION

1. Field of the Invention

The present invention relates to data communications, and more particularly, to detection of transmission paths compatible with digital modulation.

2. Description of the Related Art

Much of the public switched telecommunications network (PSTN) is implemented using digital data transport. Nonetheless, significant portions of the PSTN are still based on analog technology. For example, the "local loop" portion of PSTN that connects a telephone subscriber to a central office (CO) is typically an analog loop. Additionally, analog portions may exist at other points along a communications path, e.g., as an analog channel in an otherwise digital circuit.

The current generation of 56 Kbps modems (e.g., those based on K56flex™ or x2™ technology or conforming to ITU-T Recommendation V.90) no longer assume that both ends of a communications path may be analog and suffer impairment due to quantization noise introduced by analog-to-digital converters (ADCs). Instead, such modems assume that there is only one (1) analog portion in a downstream transmission path from a digitally connected server modem to a client modem connected to an analog local loop. This assumption is reasonable in areas where most Internet Service Providers (ISPs) and business customers are digitally connected to the network and allows data signaling rates of up to 56 Kbps in the downstream transmission path. K56flex is a trademark of Lucent Technologies Inc. and x2 is a trademark of 3Com Corporation.

Although a variety of similar designs are available, modems conforming to the ITU-T Recommendation V.90 are illustrative. See generally, ITU-T Recommendation V.90, A Digital Modem and Analogue Modem Pair for Use on the Public Switched Telephone Network (PSTN) at Data Signalling Rates of up to 56 000 Bit/S Downstream and up to 33 600 Bit/S Upstream (09/98), the entirety of which in incorporated by reference herein. Recommendation V.90 defines a method for signaling between a modem connected to an analog loop (the analog modem) and a modem connected to the digital trunk (the digital modem). Modems in accordance with Recommendation V.90 take advantage of this particular arrangement to increase the data signaling rate from the digital modem towards the analog modem. The quantization noise from a mu-law or A-law PCM converter typically limits the signal-to-noise ratio (SNR) to about 38 dB. However, the detrimental effect of quantization noise can be avoided in certain cases. If there are no analog-to-digital conversions in the downstream path from the digital V.90 modem to the analog modem, the PCM codes from the digital modem are converted to discrete analog voltage levels in the local CO and are sent to the analog modem via the analog local loop. The analog modem's receiver then reconstructs the discrete network PCM codes from the analog signals received. Using current techniques, 56 Kbps signaling rates can be achieved.

There is no specific means provided in Recommendation V.90 by which the analog client modem is to decide whether PCM signaling can be supported by the downstream channel. Rather, the client modem must make an inference about the condition of the channel during the training process. For example, one technique apparently used by some modem manufacturers is to use the L1L2 signal which is transmitted as part of probing and ranging in phase 2 of startup procedures specified in Section 9.2 of Recommendation V.90 to estimate the high-end frequency response of the channel. A channel over which PCM operation is possible will typically exhibit less roll-off at frequencies near the upper edge of the voice band (0–4000 Hz) than will channels that cannot support PCM. There is no assurance, however, that good high-frequency response will correlate with good PCM operation, and poor high-frequency response by itself does not prelude PCM operation. Therefore, such methods assume a relationship between high-frequency response and PCM operation that is not valid in many practical cases. If the client modem fails accurately to assess the channel, then subsequent data exchange either will fail or will occur at less than optimal speeds.

SUMMARY OF THE INVENTION

Accordingly, an improved technique has been developed for reliably determining whether the transmission path between data communications equipment is free of analog-to-digital conversions. Such an analog-to-digital conversion may occur in a variety places in the transmission path and introduces quantization noise that is typically incompatible with desired data signaling schemes. For example, a quantization noise introducing conversion may occur in private branch exchange (PBX) equipment, within the public switched telecommunications network (PSTN) due to a particular routing via at least one analog channel, or due to the effect of multiplexing equipment. More generally, the techniques described herein are applicable to detection of error introducing signal conversions.

In an illustrative embodiment, an improved digital connection detection technique allows a modem coupled to an analog loop to select between receive modes, e.g., between V.90/PCM and V.34 modes. Implementation of such a selection is an essential part of the training procedure for modems that conform to ITU-T Recommendation V.90; however, the techniques described herein are also applicable to other data communications configurations and equipment. For example, the techniques are also suitable for detection of quantization noise introducing conversions in a transmission path between digital modems digitally connected to the digital trunk of the PSTN.

These and other suitable configurations will be better appreciated by persons of ordinary skill in the art based on the specification and claims that follow.

BRIEF DESCRIPTION OF THE DRAWINGS

The present invention may be better understood, and its numerous objects, features, and advantages made apparent to those skilled in the art by referencing the accompanying drawings.

FIGS. 1A, 1B, 1C and 1D illustrate various communication path configurations between a server modem and a client modem. In particular, FIG. 1D illustrates several configurations in which an unsynchronized quantization error introducing conversion occurs between the transmitter of a server modem and a receiver of a client modem.

The use of the same reference symbols in different drawings indicates similar or identical items.

DESCRIPTION OF THE PREFERRED EMBODIMENT(S)

Figure 1A:
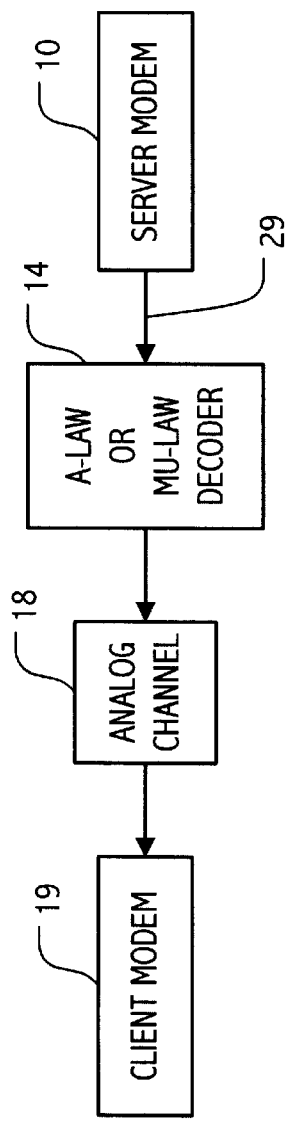

FIGS. 1A, 1B, 1C, and 1D illustrate four illustrative communications path configurations. The configuration of FIG. 1A is the simplest. In FIG. 1A, a server modem 10, e.g., a digital V.90 modem, generates a digital signal that forms an input to a decoder 14, e.g., an A-law decoder or a mu-law decoder, that converts digital signals received from modem 10 and supplies a corresponding modulated analog signal via analog channel 18. Analog channel 18 conveys the modulated analog signal to client modem 19, e.g., an analog V.90 modem.

Figure 1B:
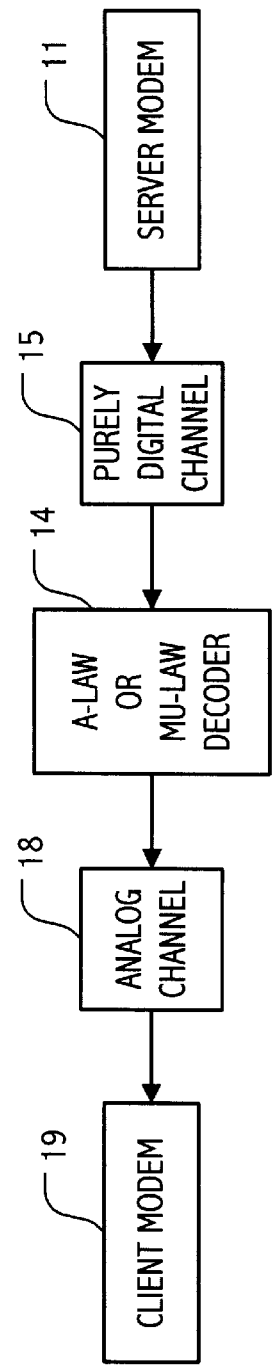

FIG. 1B illustrates a communications path configuration that, from the point of view of the client modem, is equivalent to that of FIG. 1A. Digital channel 15 conveys digital signals encoded as PCM codewords from server modem 11 to decoder 14. In turn, decoder 14 supplies a corresponding modulated analog signal to client modem 19 via analog channel 18.

FIG. 1C illustrates a variation in which robbed bit signaling (RBS) is employed. RBS is a technique sometimes used by digital carriers to multiplex channel control information into the data stream. Using RBS, the digital carrier "steals" the low order bit of certain voice samples to instead convey call progress indications. As before, a server modem supplies digital signals that are decoded, e.g., by decoder 17, and supplied via an analog channel, e.g., analog channel 18, to client modem 19. In the configuration of FIG. 1C, at least some portion of digital channel 16 employs RBS.

FIG. 1D illustrates an exemplary communications path configuration in which V.90 PCM operation is not possible because of an analog-to-digital conversion in the transmission path from the digital modem to the analog modem. In particular, although digital channel 21 conveys digital signals encoded as PCM codewords from server modem 20 to decoder 22, the corresponding modulated analog signals supplied by decoder 22 are not supplied directly to client modem 19. Instead, intervening analog-to-digital and digital-to-analog conversions are performed at encoder 24 and decoder 26, respectively. FIG. 1D illustrates at least several situations. For example, decoder 22, analog channel 23 and encoder 24 may represent an analog portion of a routing through an otherwise digital trunk 31 of the PSTN. Alternatively, encoder 24, digital channel 25 and decoder 26 may represent customer premises equipment such as a digital PBX that performs an additional ADC/DAC step 32 or may represent telephone company multiplexing equipment in a composite analog channel 33. In each case, a quantization error introducing conversion appears in the transmission path.

Although not illustrated, other digital impairments, such as unsynchronized digital conversions, etc. may also introduce noise or quantization errors. Furthermore, a given communications path may exhibit one or more digital impairments. In general, techniques described herein allow discrimination between a communications path without unsynchronized noise introducing conversions and a communication path with at least one such conversion. Based on the description herein, persons of ordinary skill in the art will appreciate a variety of applications of the underlying techniques and the breadth of the appended claims. Nonetheless, and without limitation thereto, a V.90 modem configuration provides a useful example.

As described above, modems in accordance with ITU-T Recommendation V.90 take advantage of arrangements such as that illustrated in FIG. 1B, where there is no analog-to-digital (or other quantization error introducing) conversion in the downstream path from the digital V.90 modem to the analog V.90 modem, to increase the data signaling rate from the digital modem towards the analog modem. As now described more completely, techniques have been developed to detect unsynchronized quantization error introducing conversions in a communications path such as that from server modem 20 to client modem 19. However, as will be appreciated by persons of ordinary skill in the art based on the description herein, these techniques are not limited to V.90 modem configurations or merely to the detection of an analog-to-digital conversion. Indeed, the techniques described herein are generally useful in detecting a wide variety of noise introducing signal conversions and in determining the characteristics of an ostensibly end-to-end digital communications path between two digital communications devices. Nonetheless, a typical V.90 modem configuration illustrates application of the developed techniques to the problem of determining whether a communications path includes any of the typical unsynchronized conversion sources of quantization error.

In some configurations in accordance with the present invention, segments of a particular modem training signal, L1L2, are used to detect unsynchronized quantization error introducing conversions. L1L2 is a periodic signal with an exact period of 6 2/3 ms. A digital server modem interpolates an L1L2 signal to an 8000 Hz sample rate and converts the interpolated L1L2 signal to a sequence of digital PCM codewords by encoding each sample according to a mu-law or A-law. This conversion is not one-to-one and some quantization error is introduced. Since the L1L2 signal is periodic, the resulting sequence of PCM codewords will also be periodic. However, because the period of the underlying L1L2 signal does not correspond to an integer number of samples at the 8000 Hz sampling rate used by PSTN digital trunk, the encoded sequence has a larger period, that corresponds to multiple periods of L1L2 and an integer number of 8000 Hz samples. The smallest such period is 20 ms (three periods of L1L2 and 160 samples at 8000 Hz). When converted to analog form, e.g., by decoder 14, 17 or 26 (FIGS. 1A, 1B, 1C and 1D) or typically by the codec driving an analog local loop, the resulting signal will be equal to the original L1L2 signal but will be affected by quantization noise.

When transmitted through a digital channel, the above-described encoded sequence may also be affected by Robbed Bit Signaling (RBS). RBS modifies the least significant bits of some of the PCM codewords according to periodic pattern with the period of 6, 12 or 24 samples. Because of the periodic nature of the RBS effect (i.e., modification of the least significant bits of each 6th, 12th or 24th codeword) the sequence of PCM codewords corresponding to L1L2 signal will remain periodic, however the period will increase to correspond to a multiple of RBS pattern period. The smallest such period is 60 ms (9 periods of L1L2, 480 samples at 8000Hz and 80, 40 or 20 periods of the RBS pattern). When converted to analog form, e.g., by decoder 14, 17 or 26 (FIGS. 1A, 1B, 1C and 1D) or typically by the codec driving an analog local loop, the resulting signal will be equal to the original L1L2 signal but will be affected by quantization noise.

Advantageously, this quantization noise is itself periodic, having a period equal to the period of the encoded PCM sequence (e.g., 160 or 480 samples at 8000 Hz in accordance with the examples above). If an unsynchronized quantization step (e.g., an analog-to-digital conversion) occurs between the transmitter of the digital server modem and the receiver of the analog client modem, the true L1L2 signal will retain its periodic character; however, the periodic component of quantization noise will not. By filtering received signals to detect the periodic component of quantization noise, a data communications device in accordance with the present invention is able to unambiguously identify an unsynchronized quantization step and, in certain configurations, select an appropriate mode of operation.

In general, the illustrative V.90 modem application of the techniques described herein exploits several properties of the digital server modem to analog client modem communications path configuration to permit the analog client modem to determine whether PCM operation is possible.

First, the input supplied by the digital server modem (e.g., server modem 10, 11, 12 or 20) into the digital transport (e.g., at connection 29, digital channel 15, digital channel with RBS 16, or digital channel 21, respectively) is sampled at 8000 Hz and includes the sum of either two or three components: (1) a true signal component, (2) a quantization error component, and (3) an RBS component, if present. The period of the true signal component is 53 1/3 samples, meaning that the signal component repeats itself exactly every 3× (53 1/3)=160 samples. Similarly, the quantization error component repeats itself exactly every 160 samples. The period of the robbed-bit-signaling component (if present) is 6, 12, or 24 samples.

Second, if the transfer function of the communications path, which in the configurations of FIGS. 1A, 1B, 1C and 1D includes analog channel 18 or 27, is essentially linear, the steady-state output to analog client modem 19 (e.g., from analog channel 18 or 27) includes the sum of two or three components that retain the same periodic properties as the input supplied to the digital transport. Although the waveforms of the three components may be modified in the communications path, each output component is still periodic with the same period as its corresponding input component.

Third, when the output of the essentially linear communications path is sampled at 9600 Hz, e.g., by analog client modem 19, the sampled signal again includes the sum of two or three component: (1) the true signal component with a period of 6 2/3 ms (exactly 64 samples at 9600 Hz), (2) the quantization error component with a period of 20 ms (exactly 192 samples at 9600 Hz) and (3) the RBS component (if present) with a period of either 7.2, 14.4, or 28.8 samples. Again at 9600 Hz, the RBS component repeats itself exactly in 36, 72, or 144 samples. Because 144 is the least common multiple of 36, 72, and 144, the RBS signal (if present) will repeat itself every 144 samples in all cases. Although exemplary configurations are described in the context of a 9600 Hz sample rate, other sample rates would also be suitable.

Finally, even if an analog-to-digital conversion (or other unsynchronized quantization error introducing conversion) exists between the digital server modem transmitter and the analog client modem receiver, the true signal component received by the client modem will retain its periodic character. The quantization error component, however, will not. The RBS component may or may not be affected.

In short, the received signal at the analog client modem, when sampled at 9600 Hz, includes the sum of one, two or three periodic signals, depending on the configuration of the communications path that connects the modems. Each of these signals, if present, has a different fundamental period. Any or all of these periodic signals can be suppressed in various ways with digital filters and the presence or absence of the various signals can then be determined by power measurements.

Though persons of ordinary skill in the art will appreciate a variety of suitable techniques for detecting presence or absence of signal components of known periodicity, the properties of a simple digital filter are exemplary. For example, let x(k) be a signal composed of a sequence of samples that is periodic with period K. If the samples of the signal are denoted by {x(k); k=. . . −1, 0, 1, . . . }, then x(k) satisfies the condition $$x(k)=x(k+K) \qquad (1)$$

for all k. When such a signal is applied to the input of a digital filter with transfer function $$H(z)=1-z^{-K} \qquad (2)$$

the steady-state output is zero. To see that this is true, note that H(z) has unit-sample response $$h(k)=\delta(k)-\delta(k-K) \qquad (3)$$

where $\delta(k)=1$ if k=0, and where $\delta(k)=0$, otherwise. If x(k) is input to a filter implementation of H(z), the steady-state filter output is the convolution of x(k) with h(k). Using "*" to denote convolution, $$y(k) = x(k)^*[\delta(k) - \delta(k-K)] \qquad (4)$$

$$= x(k) - x(k-K) \qquad (5)$$

$$= 0 \qquad (6)$$

because of equation (1).

Exemplary Configuration 1

Figure 2:
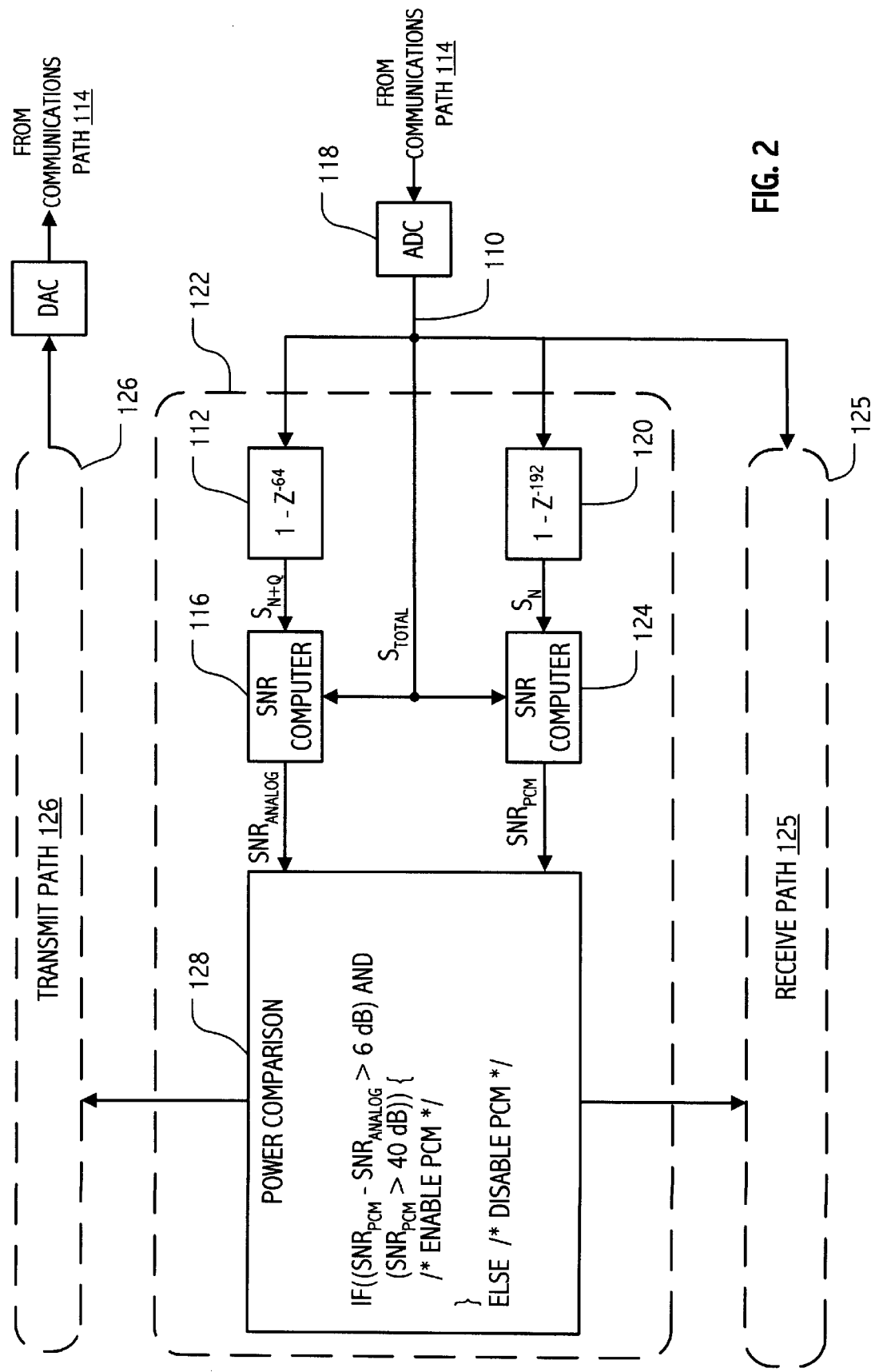
FIG. 2 depicts a digital connection detection configuration in accordance with an exemplary embodiment of the present invention.

Building on the above, FIG. 2 illustrates an exemplary filter configuration for determining whether a sufficient periodic component of quantization error remains in a received L1L2 signal to indicate absence of unsynchronized quantization error introducing conversions in the communications path from which the L1L2 signal was received. Such a filter configuration is suitable for use in a receive path (e.g., in receive path circuits or as part of receive path signal processing) of a modem (e.g., an analog V.90 modem) during a startup sequence in which the L1L2 signal is supplied (e.g., from a digital V.90 modem). This exemplary configuration ignores the effects of RBS. A received sampled sequence 110 is obtained by sampling (e.g., at 9600 Hz by analog-to-digital converter 118) the output of communications path 114. In general, communications path 114 may be similar to any of those illustrated in FIGS. 1A, 1B, 1C and 1D as well as more complex variations thereon or combinations thereof. Furthermore, a variety of digital impairments may be detected. Nonetheless, for the sake of illustration, we consider two exemplary situations. Either an unsynchronized analog-to-digital conversion appears in communications path 114 or it does not. Consider these two cases separately.

Case 1 (No Intervening Conversion): In this case, received sampled sequence 110 includes, in the steady-state, two periodic components: (1) a true signal component with a period corresponding to 64 samples (at 9600 Hz) and (2) a quantization error component with a period corresponding to 192 samples (at 9600 Hz). In addition, the received signal will inevitably include some amount of random noise.

Received sampled sequence 110 is supplied to digital filter 112 that effectively suppresses the true signal component of the received signal. The output, $S_{N+Q}$, of digital filter 112 therefore includes only random noise (N) and the quantization error signal (Q) introduced by the 8000 Hz sampling at a server modem such as server modem 10, 11, 12, or 20. Received sampled sequence 110 is also supplied to digital filter 120 that effectively suppresses both the true signal and the quantization error signal. The true signal is suppressed because, having a period 64, it also is periodic with any period that is an integer multiple of 64 including 3×64=192. The output, $S_N$, of digital filter 120 therefore represents random noise alone.

Case 2 (Intervening Analog-to-Digital Conversion): In this case, received sampled sequence 110 includes, in the steady-state, only one periodic component, namely the true signal component with a period corresponding to 64 samples (at 9600 Hz). The quantization error component of received sampled sequence 110 will be the sum of at least two quantization steps, namely that introduced by the 8000 Hz sampling at a server modem and that introduced by the intervening analog-to-digital conversion. Because the intervening analog-to-digital conversion is unsynchronized with server modem sampling, the quantization error component of received sampled sequence 110 will have lost its periodic character (or at least its 192 sample periodic component). As a result, the output, $S_N$, of digital filter 120 includes random noise as well as error introduced in the quantization steps.

Received sampled sequence 110 is supplied to digital filter 112 that effectively suppresses the true signal component of the received signal. The output, $S_{N+Q}$, of digital filter 112 therefore includes random noise and the quantization error introduced in the server modem and in the intervening analog-to-digital conversion. Received sampled sequence 110 is also supplied to digital filter 120 that effectively suppresses the true signal. The quantization error signal is not suppressed because it is no longer periodic (at least not with a period corresponding to 192 samples). Consequently, the output, $S_N$, of digital filter 120 should have approximately the same power level as the output, $S_{N+Q}$, of digital filter 112.

In the context of an exemplary V.90 modem embodiment, the decision as to whether PCM operation is possible depends on the relative values of the signal-to-noise ratio (SNR) values calculated in SNR computers 116 and 124. SNR computer 116 computes $$SNR_{ANALOG} = 10 \log(<S_{TOTAL}>/<S_{N+Q}>) \quad (7)$$

where $S_{TOTAL}$ corresponds to received sampled sequence 110 and $S_{N+Q}$ corresponds to the random noise signal plus the quantization error signal.

SNR computer 124 computes $$SNR_{PCM} = 10 \log(<S_{TOTAL}>/<S_N>) \quad (8)$$

where, as before, $S_{TOTAL}$ corresponds to received sampled sequence 110 and $S_N$ corresponds to the random noise signal. The notation <...> indicates a time average of the square of the quantity between the brackets. Any of a variety of realizations of SNR computers 116 and 124 is suitable.

Communication paths suitable for voice band communications are typically designed so that $SNR_{ANALOG}$ is approximately 38 dB. If there is no intervening analog-to-digital conversion, $SNR_{PCM}$ should be significantly larger than that, e.g., greater than 40 dB. Power comparison 128 implements exemplary decision logic for selecting a suitable downstream modulation scheme. For example, in some embodiments, power comparison 128 may select PCM in accordance with V.90 or QAM in accordance with V.34 or other scheme.

For example, one suitable decision rule for power comparison 128 is as follows: if $SNR_{PCM}$ is greater than $SNR_{ANALOG}$+6 dB and $SNR_{PCM}$ is greater than 40 dB, then PCM operation is enabled. Otherwise, V.34 operation is enabled. In this context, values of 6 dB and 40 dB are merely exemplary and other suitable thresholds may be employed. A client modem implementing the above technique will typically signal the server modem (e.g., via transmit path 126 and in accordance with a V.90, V.8-style or other startup sequence specification) to indicate the selected modulation. In addition, the corresponding demodulation to be performed by receive path 125 is also based on decision logic of power comparison 128. In typical modem configurations, conversion detection component 122 is enabled only during start-up, e.g., in a V.90 modem configuration, during probing and ranging (Phase 2) of the prescribed start-up procedure.

Exemplary Configuration 2

Figure 3:
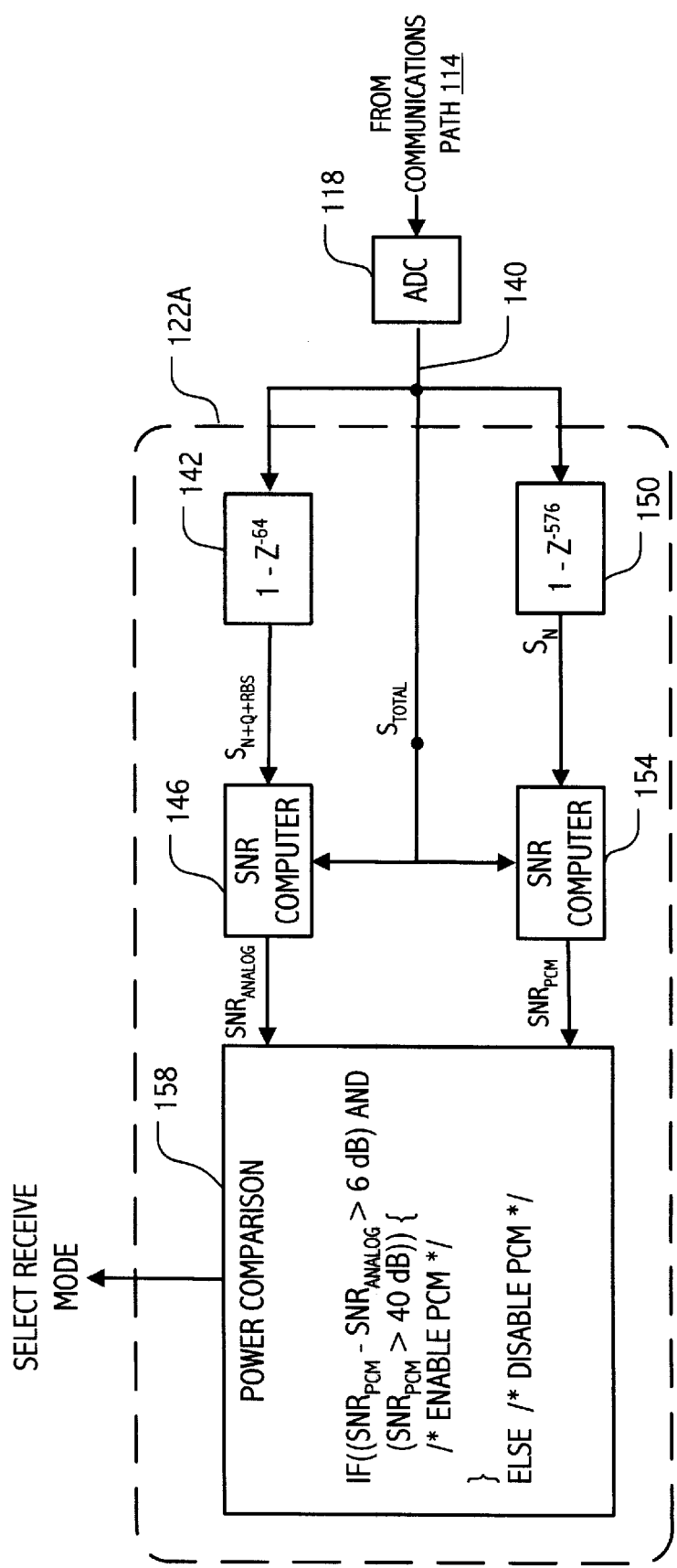
FIG. 3 depicts a digital connection detection configuration in accordance with an exemplary embodiment of the present invention suitable for use in a communication path in which Robbed Bit Signaling (RBS) is employed.

FIG. 3 illustrates an extension to the basic configuration described above. As before, the exemplary filter configuration of FIG. 3 determines whether a sufficient periodic component of quantization error remains in a received L1L2 signal to indicate absence of unsynchronized quantization error introducing conversions, such as an analog-to-digital conversion, in the communications path from which the L1L2 signal was received. However, unlike the previous configuration, that of FIG. 3 is robust to the effects of RBS, if present.

Received sampled sequence 140 is obtained by sampling (e.g., at 9600 Hz by analog-to-digital converter 118) the output of communications path 114. Depending on the configuration of communications path 114, RBS may or may not be present and there may or may not be an unsynchronized analog-to-digital conversion. This leads to four cases.

Case 1 (RBS Present No Intervening Conversion): In this case, received sampled sequence 140 includes, in the steady-state, three periodic components: (1) a true signal component with a period corresponding to 64 samples, (2) a quantization error component with a period corresponding to 192 samples and (3) an RBS signal with a period corresponding to 36, 72, or 144, all at 9600 Hz. As before, the received signal will inevitably include some amount of random noise.

Received sampled sequence 140 is supplied to digital filter 142 that effectively suppresses the true signal component of the received signal. The output, $S_{N+Q+RBS}$, of digital filter 142 therefore includes random noise plus the quantization error signal introduced in the server modem plus the effect of RBS. Received sampled sequence 140 is also applied to digital filter 150 that effectively suppresses the true signal, the quantization error signal, and the RBS signal. Because the delay exponent, i.e., 576, of digital filter 150 is the least common multiple of 64, 192, 36, 72, 144, the filter suppresses each of the above-described periodic components. The output, $S_N$, of filter 150 therefore represents random noise alone.

Case 2 (RBS Present, Intervening Analog-to-Digital Conversion): In this case, received sampled sequence 140 includes, in the steady-state, two periodic components: (1) the true signal component with a period corresponding to 64 samples and (2) an RBS signal with a period corresponding to 36, 72, or 144, both at 9600 Hz. The quantization error component of received sampled sequence 140 will be the sum of at least two quantization steps, namely that introduced by the 8000 Hz sampling at a server modem and that introduced by the intervening analog-to-digital conversion. Because the intervening analog-to-digital conversion is unsynchronized with server modem sampling, the quantization error component of received sampled sequence 140 will have lost its periodic character (or at least its 576 sample periodic component). As a result, the output, $S_N$, of digital filter 150 includes random noise as well as error introduced in the quantization steps.

Received sampled sequence 140 is supplied to digital filter 142 that effectively suppresses the true signal component of the received signal. The output, $S_{N+Q+RBS}$, of digital filter 142 therefore includes random noise, quantization error introduced in the server modem and in the intervening analog-to-digital conversion, and the RBS signal. Received sampled sequence 140 is also supplied to digital filter 150 that effectively suppresses the true signal and the RBS signal. The quantization error signal is not suppressed because it is no longer periodic (at least not with a period corresponding to 576 samples). Consequently, $S_N$ will include noise as well as quantization error and therefore the output of digital filter 150 should have approximately the same power level as the output, $S_{N+Q+RBS}$, of digital filter 142.

Cases 3 and 4 (No RBS, with and without an Intervening Conversion):

Handling of these cases is substantially similar to those described above with reference to FIG. 2. Because the delay exponent of digital filter 150 still corresponds to the quantization error period (3×192=576), operation of the FIG. 3 filter configuration, absent RBS, is consistent with that of FIG. 2.

In the context of an illustrative V.90 modem embodiment, the decision as to whether PCM operation is possible depends on the relative values of the signal-to-noise ratio (SNR) values calculated in SNR computers 146 and 154. SNR computer 146 computes $$SNR_{ANALOG}=10\ \log(<S_{TOTAL}>/<S_{N+Q+RBS}>) \quad (9)$$

where $S_{TOTAL}$ corresponds to received sampled sequence 140 and $S_{N+Q+RBS}$ corresponds to the random noise signal plus the quantization error signal plus the RBS signal. SNR computer 154 computes $$SNR_{PCM}=10\ \log(<S_{TOTAL}>/<S_N>) \quad (10)$$

where, again, $S_{TOTAL}$ corresponds to received sampled sequence 140 and $S_N$ corresponds to the random noise signal 152. The notation <. . . > denotes a time average of the square of the quantity between the brackets.

As before, power comparison 158 implements decision logic for selecting suitable a downstream modulation scheme. For example, one suitable decision rule is as follows: If $SNR_{PCM}$ is greater $SNR_{ANALOG}$+6 dB and $SNR_{PCM}$ is greater than 40 dB, then PCM operation is enabled. Otherwise, V.34 operation is enabled. Alternative decision logic may discriminate between transmission paths with and without RBS in addition to those with and without an unsynchronized quantization error introducing conversion. Suitable modifications, e.g., addition of a third digital filter or definition of multiple decision thresholds, will be appreciated by persons of ordinary skill in the art. In the configuration illustrated, conversion detection component 122A is selective for a receive mode of a data communications device (not shown), although other responsive actions, including signaling another data communications device, enabling or disabling of impairment compensations, etc. may be performed as described elsewhere herein.

Exemplary Configuration 3

In addition to RBS, another complication that can affect implementations in accordance with the present invention is phase differences between the receiver clock, e.g., at client modem 19, and that of the digital transport. To reduce the effect of phase drift on configurations such as those described above, the underlying techniques can be applied to the noise signal rather than the L1L2 signal itself.

For example, in an exemplary configuration, the received L1L2 signal is first processed by a finite impulse response (FIR) filter with a delay exponent of 64. As described above, the output of such a FIR $(1-Z^{-64})$ is a combination of all sources of noise including quantization noise, which for a digital connection is the dominant source of noise. In a communications path configuration with phase drift, the noise includes phase drift noise.

The output of the first filter is processed by three additional FIR filters:
 a. $1-Z^{-512}$
 b. $1-Z^{-576}$
 c. $1-Z^{-384}$ The signal power of FIR (a) is proportional to the variance of all sources of noise including the PCM quantization noise. The signal power of FIR (b) is proportional to the variance of all sources of noise excluding the PCM quantization noise and excluding the error due to robbed bit signaling. Finally, the signal power of FIR (c) is proportional to the variance of all sources of noise excluding the PCM quantization noise but including the noise due to robbed bit signaling.

Consequently, powers (a), (b) and (c) can be compared to discriminate between various possible communications path configurations. For example, if power (a)>power (b)+6 dB then there is a direct digital connection from the server modem without intervening unsynchronized error introducing conversions. Otherwise, the communications path includes at least one unsynchronized error introducing conversion, such as an analog-to-digital conversion associated with an analog channel within the PSTN routing, a digital PBX, multiplexing equipment, etc. If a direct digital connection is present and if power (c)>power (b)+3 dB, then robbed bit signaling is present.

Other Embodiments

While the invention has been described with reference to various embodiments, it will be understood that these embodiments are illustrative and that the scope of the invention is not limited to them. For example, although certain aspects have been described with reference to exemplary V.90 modem configurations, embodiments in accordance with the present invention are not limit to V.90 modems, to modem in general, to voice band communication equipment, or to use in conjunction with communications path configurations including the PSTN or an analog local loop.

Similarly, use of the L1L2 signal typically employed in accordance with standardized modem start-up procedures is merely exemplary. In other configurations, other suitable signals having fundamental periods (or multiples thereof) not equal to an integer number samples at the digital transport sampling rate may be used for unsynchronized quantization error introducing step detection. For example, using the 8000 Hz sampling rate of the PSTN digital transport, signals such as the 2100 Hz answer tone may be used. In such configurations, quantization noise has a period of 80 samples (at 8000 Hz). If the 2100 Hz answer tone is sampled at 7200 Hz by a receiver, the period thereof corresponds to 24 samples, while quantization noise exhibits a period of 72 samples. Based on the description herein, persons of ordinary skill in the art will appreciate suitable filter configurations. In addition, persons of ordinary skill in the art will appreciate suitable configurations for other periodic signals, other digital transport sampling rates and other receiver sampling rates.

Furthermore, although detection of unsynchronized error introducing conversions have been described in the context of an exemplary V.90 configuration in which such detections (or lack thereof) are used to select an appropriate modulation scheme, other exploitations of the techniques are also possible. For example, selective enablement/disablement of impairment compensations such as far-end echo cancellation, phase-jitter cancellation, frequency shift compensation, etc. can be driven by detections performed in accordance with the present invention and the techniques described herein. Such selective enablement/disablement may be employed even in situations where V.34 modulation is selected or required (e.g., because the client modem does not support PCM). In such situations, detection of a digital connection may allow disabling of far-end echo cancellation. Based on the description herein, other opportunities for selective responses to the results of communication path characterization (as described herein) will be apparent to persons of ordinary skill in the art.

Other applications will also be appreciated based on the description herein. For example, the techniques described herein may be employed in a variety of modem and modem-like devices as well as in computers, portable or handheld communications devices, personal digital assistant-type devices, and mobile phones employing data communications facilities. Furthermore, the techniques described herein may be exploited in the context of other current communications technologies such as those employing outside voice band signaling as well as in the context of later developed communications technologies and communications standards, all without departing from the spirit and scope of the invention as described herein. These and other variations, modifications, additions, and improvements of the embodiments described may fall within the scope of the invention as defined by the claims that follow.

What is claimed is:

1. A method of detecting a noise introducing signal conversion in a transmission path, the method comprising:
   receiving a predetermined periodic signal; and
   detecting a periodic component of quantization noise therein,
   wherein the noise introducing signal conversion includes at least one quantization step unsynchronized with an initial quantization of the predetermined periodic signal in accordance with a digital transport.

2. A method as in claim 1,
   wherein the predetermined periodic signal is quantized in accordance with a digital transport sampling rate.

3. A method as in claim 1,
   wherein the predetermined periodic signal includes an L1L2 signal.

4. A method as in claim 1,
   wherein the noise introducing signal conversion obscures the periodic component of quantization noise in the received predetermined periodic signal.

5. A method as in claim 1,
   wherein the noise introducing signal conversion includes at least one analog-to-digital conversion.

6. A method as in claim 1,
   wherein the noise introducing signal conversion includes Robbed Bit Signaling (RBS).

7. A method of detecting at a receiver, existence of an unsynchronized quantization error introducing conversion in a transmission path thereto, said method comprising:
   receiving a predetermined periodic signal; and
   filtering said received signal to detect a periodic component of quantization error therein,
   wherein said predetermined periodic signal is selected to have a period or periods coinciding with a non-integer number of samples of the digital transport associated with said transmission path such that said predetermined periodic signal and said periodic component exhibit differing periods.

8. A method as in claim 7,
   wherein said predetermined periodic signal is selected to cause introduction of said periodic component when quantized for digital transport; and
   wherein said unsynchronized quantization error introducing conversion substantially obscures said periodic component.

9. A method as in claim 7,
   wherein said predetermined periodic signal includes an L1L2 signal.

10. A method as in claim 7,
    wherein said predetermined periodic signal is supplied during a training period of a startup sequence in a data communications device.

11. A method as in claim 7,
    wherein said predetermined periodic signal includes an answer tone.

12. A method of operating a modem, said method comprising:
    receiving a periodic signal from transmission path;
    filtering said received periodic signal to detect a periodic component of quantization error therein;
    responsive to a detection of said periodic component of quantization error, adapting a receiver thereof to a characteristic of said transmission path; and
    responsive to detection of less than a threshold level of said periodic component of quantization error, causing said receiver to enter an analog mode of operation.

13. A method as in claim 12,
    wherein said adapting includes causing the receiver to enter a digital mode of operation.

14. A method as in claim 12,
    wherein said adapting includes causing the receiver to forgo compensation for a particular impairment.

15. A method as in claim 14,
    wherein said forgone impairment compensation includes far-end echo cancellation.

16. A method as in claim 14,
    wherein said forgone impairment compensation includes phase jitter compensation.

17. A method as in claim 14,
    wherein said forgone impairment compensation includes frequency shift compensation.

18. A method as in claim 14,
    wherein said detection of said periodic component of quantization error is indicative of a direct digital connection; and
    wherein said forgone impairment compensation is unnecessary in the context of said direct digital connection.

19. A method of operating a modem, said method comprising:
    receiving, during an initialization period, a signal from a remote modem;

filtering said received signal to detect a periodic component of quantization error therein; and responsive to a detection of said periodic component of quantization error, causing said modem to enter a digital mode of operation, wherein said periodic component of quantization error is indicative of an absence of unsynchronized quantization error introducing conversion in a transmission path from said remote modem.

20. A method as recited in claim 19, wherein said received signal includes an L1L2 signal.

21. A method as in claim 19, wherein said periodic component is introduced when a precursor of said received signal is quantized for digital transport; and wherein said unsynchronized quantization error introducing conversion substantially obscures said periodic component.

22. A method as recited in claim 19, wherein said digital mode of operation includes demodulation of a pulse amplitude modulated (PAM) signal.

23. A method of operating a modem, said method comprising:

receiving, during an initialization period, a signal from a remote modem;

filtering said received signal to detect a periodic component of quantization error therein;

responsive to a detection of said periodic component of quantization error, causing said modem to enter a digital mode of operation; and responsive to detection of less than a threshold level of said periodic component, causing said modem to enter an analog mode of operation.

24. A method as recited in claim 23, wherein absence of more than said threshold level of said periodic component is indicative of at least one unsynchronized quantization error introducing conversion in a transmission path from said digital modem.

25. A method as recited in claim 23, wherein absence of more than said threshold level of said periodic component is indicative of at least one analog-to-digital conversion in a transmission path from said digital modem.

26. A method as recited in claim 23, wherein said modem is an analog modem connected to an analog portion of a transmission path from said digital modem; and wherein absence of more than said threshold level of said periodic component is indicative that a transmission path from said digital modem includes at least one other analog portion.

27. A method as recited in claim 23, wherein said analog mode of operation includes demodulation of a quadrature amplitude modulated (QAM) signal.

28. A method of detecting presence of a transmission path characteristic incompatible with digital, said method comprising:

quantizing a precursor signal of known periodicity and supplying said quantized signal via said transmission path;

detecting presence or substantial absence of a periodic component of quantization error in a received signal corresponding to said precursor signal, and wherein said precursor signal and said periodic component of quantization error exhibit different periods, thereby facilitating said detecting.

29. A method of selecting between digital and analog receive modes in a modem, said method comprising:

determining whether periodic quantization noise is a substantial component of noise in a received periodic signal;

if so, selecting said digital receive mode; and if not, selecting said analog receive mode.

30. A method as in claim 29, wherein said digital receive mode is in accordance with ITU-T Recommendation V.90.

31. A method as in claim 29, wherein said analog receive node is in accordance with ITU-T Recommendation V.34.

32. A method as in claim 29, wherein said substantial component is at least 3 dB greater than another component of said noise.

33. A data communications equipment apparatus comprising:

digital filters defined to detect a periodic component of quantization error in a probe signal, wherein said digital filters are operably selective for receive path signal processing appropriate to either digitally encoded signals or analog signals.

34. A data communications equipment apparatus as in claim 33, further comprising:

transmit and receive path signal processing structures of an analog modem, said receive path signal processing structures operable to:

to demodulate received digitally encoded signals upon successful detection of said periodic component; and otherwise, to demodulate received analog signals.

35. A data communications equipment apparatus as in claim 33, wherein said probe signal is supplied by a digital data communications equipment apparatus and wherein said periodic component is introduced by operation thereof.

36. A data communications equipment apparatus as in claim 35, coupled to a communications path from said digital data communications equipment apparatus, wherein said periodic component is substantially obscured by operation of an unsynchronized quantization error introducing conversion along said communications path.

37. A data communications equipment apparatus as in claim 33, wherein said probe signal includes a predetermined initialization sequence signal of known period; and wherein said digital filters are operable during an initialization period to detect said periodic component of quantization error in said predetermined initialization sequence signal.

38. A data communications equipment apparatus as in claim 33, wherein said digital filters have coefficients defined to distinguish between an L1L2 initialization sequence with and without said periodic component of quantization error.

39. A method of detecting an unsynchronized error introducing conversion in a communication channel, said method comprising:

quantizing a signal in accordance with a digital transport, wherein the period of said signal corresponds to a non-integer number of samples of said digital transport;

supplying said quantized signal at a first end of said communication channel;

receiving, at a second end of said communication channel, a signal corresponding to said supplied quantized signal; and filtering said received signal to detect a periodic component of error therein, wherein absence of said periodic component is indicative of said unsynchronized error introducing conversion.

40. A method as in claim 39, wherein said unsynchronized error introducing conversion includes an analog-to-digital conversion in said communication channel.

41. A method as in claim 39, wherein said unsynchronized error introducing conversion includes a transcoding conversion.

42. A method as in claim 39, wherein said unsynchronized error introducing conversion includes conversion between said digital transport and another digital transport having a different clock.

43. An apparatus comprising:

a transmit path;

a receive path; and signal processing structures coupled into said receive path to detect a periodic component of quantization error, if present, in a received probe signal, wherein said signal processing structures are operable to select a receive mode of said receive path.

44. An apparatus as in claim 43, wherein said transmit and said receive paths provide data communications functionality in one of a computer, a portable or handheld communications device, a personal digital assistant-type device, a set-top box, a cable modem, a non-voice band communications device, and a data-capable mobile phone.

45. A computer program product comprising:

a digital filter for detecting a periodic component of quantization error in a received signal, wherein absence of said periodic component is indicative of an unsynchronized quantization error introducing conversion; and a receive path signal processing structure responsive to said digital filter, detection of said periodic component causing said receive path signal processing structure to operate in a digital signal receive mode.

46. A computer program product as in claim 45, encoded by or transmitted in at least one computer readable medium selected from the set of a disk, tape or other magnetic, optical, or electronic storage medium and a network, wireline, wireless or other communications medium.

47. A method of operating a modem, said method comprising:

receiving, during an initialization period, a signal from a remote modem;

filtering said received signal to detect a periodic component of quantization error therein; and responsive to a detection of said periodic component of quantization error, causing said modem to enter a digital mode of operation, wherein said periodic component of quantization error is indicative of an absence analog-to-digital conversions in a transmission path from said remote modem.

48. A method as recited in clam 47, wherein said received signal includes an L1L2 signal.

49. A method as in claim 47, wherein said periodic component is introduced when a precursor of said received signal is quantized for digital transport; and wherein said unsynchronized quantization error introducing conversion substantially obscures said periodic component.

50. A method as recited in claim 47, wherein said digital mode of operation includes demodulation of a pulse amplitude modulated (PAM) signal.

51. A method of operating a modem, said method comprising:

receiving, during an initialization period, a signal from a remote modem;

filtering said received signal to detect a periodic component of quantization error therein; and responsive to a detection of said periodic component of quantization error, causing said modem to enter a digital mode of operation, wherein said periodic component of quantization error is indicative of an absence error introducing digital conversions in a transmission path from said remote modem.

52. A method as recited in claim 51, wherein said received signal includes an L1L2 signal.

53. A method as in claim 51, wherein said periodic component is introduced when a precursor of said received signal is quantized for digital transport; and wherein said unsynchronized quantization error introducing conversion substantially obscures said periodic component.

54. A method as recited in claim 51, wherein said digital mode of operation includes demodulation of a pulse amplitude modulated (PAM) signal.

55. A method of operating a modem, said method comprising:

receiving, during an initialization period, a signal from a remote modem;

filtering said received signal to detect a periodic component of quantization error therein;

responsive to a detection of said periodic component of quantization error, causing said modem to enter a digital mode of operation, wherein said modem is connected to an analog portion of a transmission path from said remote modem; and wherein said periodic component of quantization error is indicative that said transmission path includes no other analog portion.

56. A method as recited in claim 55, wherein said received signal includes an L1L2 signal.

57. A method as in claim 55, wherein said periodic component is introduced when a precursor of said received signal is quantized for digital transport; and wherein said unsynchronized quantization error introducing conversion substantially obscures said periodic component.

58. A method as recited in claim 55, wherein said digital mode of operation includes demodulation of a pulse amplitude modulated (PAM) signal.

* * * * *

UNITED STATES PATENT AND TRADEMARK OFFICE
CERTIFICATE OF CORRECTION

PATENT NO.    : 6,504,865 B1
DATED         : January 7, 2003
INVENTOR(S)   : Haixiang Liang et al.

It is certified that error appears in the above-identified patent and that said Letters Patent is hereby corrected as shown below:

<u>Column 14,</u>
Line 16, "wherein said analog receive node"
should read -- wherein said analog receive mode --.

Signed and Sealed this

Twenty-second Day of June, 2004

JON W. DUDAS
*Acting Director of the United States Patent and Trademark Office*